(12) United States Patent
Barton

(10) Patent No.: US 6,869,662 B2
(45) Date of Patent: Mar. 22, 2005

US006869662B2

(54) SELF-ADHERENT ROOFING MEMBRANE WITHOUT THE NEED FOR A REMOVABLE RELEASE LINER

(76) Inventor: James John Barton, 657 N. Starr Dr., Pickerington, OH (US) 43147

( * ) Notice: Subject to any disclaimer, the term of this patent is extended or adjusted under 35 U.S.C. 154(b) by 0 days.

(21) Appl. No.: 10/074,628

(22) Filed: Feb. 14, 2002

(65) Prior Publication Data

US 2003/0157851 A1 Aug. 21, 2003

(51) Int. Cl.$^7$ .......................... B32B 27/12; B32B 27/04; B32B 5/02
(52) U.S. Cl. ................ 428/141; 428/142; 428/147; 428/149; 428/343; 428/355 R; 428/355 AC; 442/50; 442/54; 442/58; 442/65; 442/66; 442/67; 442/79; 442/81; 442/85; 442/86; 442/87; 442/149; 442/151
(58) Field of Search .................... 435/6, 91.1, 91.2; 536/23.1, 24.3, 350

(56) References Cited

U.S. PATENT DOCUMENTS 4,569,870 A * 2/1986 Shinmi .................. 428/57

FOREIGN PATENT DOCUMENTS

GB 2148346 A * 5/1985 .......... E04D/11/02

* cited by examiner

Primary Examiner—Ula C. Ruddock

(57) ABSTRACT

The present invention relates to a non-blocking roll of roofing membrane employing a combination of silicone rubber sealant, non-woven fiberglass scrim and pressure sensitive adhesive. The method utilizes a process by which silicone rubber sealant is applied to the top surface of the non-woven fiberglass scrim and made to penetrate $\frac{1}{10}$ to $\frac{9}{10}$ of the way into the thickness of the scrim, thus no silicone rubber sealant reaches the bottom or underside surface of the scrim. To the remaining $\frac{9}{10}$ to $\frac{1}{10}$ of the scrim's thickness and to the bottom surface of the scrim is applied pressure sensitive adhesive. This construction results into a self-adherent roofing membrane that can be packaged and transferred in roll form without the need to include an additional release liner sheet or non-blocking material such as talc, mica, or clay powder.

2 Claims, No Drawings

SELF-ADHERENT ROOFING MEMBRANE WITHOUT THE NEED FOR A REMOVABLE RELEASE LINER

CROSS REFERENCE TO RELATED APPLICATIONS

| Patent search Terms CL | Utility Roofing & Silicone 52, 62, 156, 264, 427, 428, 442, 524, 525 |
|---|---|

The use of silicone rubber sealant appears in the following US roofing patents which claim its usefulness for improving the following roofing needs: solar cells, gasket material, joint sealer, moisture vapor barriers, water repellents, paint leveling, base for electrodeposition of copper, binders, roofing plate knobs, electrical junction boxes, tile, adhesives, backing strips, valves, pigments, decorative chips, mold release, granules, lubricants, adhesive inhibitor, paint, coatings, fire retardants, panels, coal tar, foam, and protective removable release liners.

U.S. PATENT DOCUMENTS

| | Solar cell coating | |
|---|---|---|
| 5,112,408 | May 1992 | Melchior |
| | Gasket material | |
| 5,970,667 | October 1999 | Thaler |
| 6,102,794 | August 2000 | Cline |
| | Joint sealers | |
| 3,996,396 | December 1976 | Hansen |
| 4,189,882 | February 1980 | Harrison |
| 4,937,995 | July 1990 | Deffeyes |
| 6,291,571 | September 2001 | Fisher |
| | Moisture Vapor Barrier | |
| 4,651,494 | March 1987 | VanWagoner |
| | Water Repellent | |
| 3,971,184 | July 1976 | VanWagoner |
| 4,021,981 | May 1977 | VanWagoner |
| 4,719,723 | January 1988 | VanWagoner |
| 5,527,409 | June 1996 | Lanphier |
| 5,837,363 | November 1998 | Colafati |
| | Paint Leveling | |
| 4,827,686 | May 1989 | Stamper |
| | Base for copper | |
| 5,417,838 | May 1995 | Goleby |
| | Binder | |
| 5,822,943 | October 1998 | Frankoski |
| | Roofing plate knobs | |
| 4,754,589 | July 1988 | Leth |
| | Electrical junction boxes | |
| 6,155,006 | December 2000 | Mimura |
| 6,182,403 | February 2001 | Mimura |
| 6,311,436 | January 2001 | Mimura |
| 6,336,304 | January 2002 | Mimura |
| | Tile | |
| 4,226,070 | October 1980 | Aragon |
| | Adhesive | |
| 5,253,461 | October 1993 | Janoski |
| | Backing strips | |
| 3,886,021 | May 1975 | Breckenfelder |
| 3,973,887 | August 1976 | Breckenfelder |
| | Valves | |
| 4,557,081 | December 1985 | Kelly |
| 4,736,562 | April 1988 | Kelly |
| | Pigments | |
| 5,035,748 | July 1991 | Burow |
| 5,368,936 | November 1994 | Braunshweig |
| | Paint | |
| 5,571,596 | November 1996 | Johnson |
| | Coating | |
| 4,029,836 | June 1977 | Wieczorek |
| 4,297,265 | October 1981 | Olsen |
| | Decorative chips | |
| 5,630,677 | May 1997 | Barroso |
| | Mold release | |
| 4,028,450 | June 1977 | Gould |
| 4,191,722 | March 1980 | Gould |
| 4,273,106 | June 1981 | Gould |
| 5,648,144 | July 1997 | Maurer |
| 6,025,052 | February 2000 | Maurer |
| | Granules | |
| 3,888,176 | June 1975 | Horai |
| 3,888,682 | June 1975 | Nelson |
| 3,888,683 | June 1975 | Horai |
| 3,894,877 | July 1975 | Nelson |
| 4,218,502 | August 1980 | Graham |
| 4,234,639 | November 1980 | Graham |
| 4,452,961 | June 1984 | Koerner |
| 4,496,476 | December 1984 | Fitsch |
| 4,537,595 | August 1985 | Gruning |
| 4,781,950 | November 1988 | Giesing |
| 5,240,760 | August 1993 | George |
| 5,286,544 | February 1994 | Graham |
| 5,362,566 | November 1994 | George |
| 6,235,372 | May 2001 | Joedicke |
| 6,238,794 | May 2001 | Beesley |
| | Lubricant | |
| 4,519,175 | May 1985 | Resan |
| | Adhesive Inhibitor | |
| 4,803,111 | February 1989 | Mansell |
| | Fire Retardant | |
| 4,587,789 | May 1986 | Tomason |
| 4,804,696 | February 1989 | Jolitz |
| | Panels | |
| 5,644,882 | July 1997 | Brown |
| | Coal tar | |
| 3,835,117 | September 1974 | Walaschek |
| 3,897,380 | July 1975 | Walaschek |
| | Foam | |
| 3,958,373 | May 1976 | Stewart |
| 4,063,395 | December 1977 | Stewart |
| | Release liners | |
| 3,751,291 | August 1973 | Schroeder |
| 3,937,640 | February 1976 | Tajima |
| 4,039,706 | August 1977 | Tajima |
| 4,045,265 | August 1977 | Tajima |
| 4,055,453 | October 1977 | Tajima |
| 4,091,135 | May 1978 | Tajima |
| 4,135,022 | January 1979 | Kennepohl |
| 4,588,637 | May 1986 | Chiu |
| 4,636,414 | January 1987 | Tajima |

-continued

| | | |
|---|---|---|
| 4,717,614 | January 1988 | Bondoc |
| 4,738,884 | April 1988 | Algrim |
| 4,757,652 | July 1988 | Kalkanoglu |
| 4,855,172 | August 1989 | Chiu |
| 4,885,887 | December 1989 | Simmons |
| 4,897,293 | January 1990 | Thessen |
| 4,936,071 | June 1990 | Karrfalt |
| 4,948,655 | August 1990 | Danese |
| 5,095,068 | March 1992 | Chiu |
| 5,204,148 | April 1993 | Alexander |
| 5,216,053 | June 1993 | Jones |
| 5,686,179 | November 1997 | Cotsakis |
| 5,733,621 | March 1998 | Cotsakis |
| 5,800,891 | September 1998 | Wasitis |
| 5,843,552 | December 1998 | Karrfalt |
| 5,916,654 | June 1999 | Phillips |
| 6,120,869 | September 2000 | Cotsakis |
| 6,228,785 | May 2001 | Miller |

STATEMENT REGARDING FEDERAL SPONSORED R & D

The United States Federal Government did not sponsor the research and development for this present invention.

REFERENCE TO SEQUENCE LISTING A TABLE, OR COMPUTER PROGRAM LISTING APPENDIX

None.

BACKGROUND OF THE INVENTION

By 1990, the majority of the recreational vehicle manufacturers were and continue to use rubber roofing membranes. The major problem experienced with rubber roofs is that they blow off when the vehicle is traveling at highway speeds into the wind on a windy day. The primary reason they blow off is inadequate adhesion due to poor adhesives and/or poor adhesive application. The failures occur when the installer does not use enough adhesive or when the installer uses too much adhesive. The difficulty is adhering to rubber which usually is covered with mica powder so the roll of rubber does not stick to itself during transportation. It is too difficult and time consuming to clean the mica from the rubber before applying adhesive.

Objectives of the Invention: It is, therefore, a primary objective of the present invention to provide an improved rubber roofing membrane—one that is ultraviolet, ozone, and water resistant while being flexible and strong and self-adherent. It is also an aim of the invention to provide a roofing membrane that can easily be installed at virtually any temperature extreme which is encountered in most parts of the world.

BRIEF SUMMARY OF THE INVENTION

The present invention encompasses a non-blocking roll of seamless silicone rubber that secures itself to a roofing substrate. It is novel because it needs no removable release liner to keep its pressure sensitive adhesive underside layer from adhering to its top surface. It has been found that the resultant roofing rubber membrane exhibits superior properties in terms of light weight, tear resistance, flexibility, slip resistance, wind resistance, tensile strength, sound transmission, reflectance, texture, insulation, adhesion, weatherability, ozone resistance, ultraviolet resistance, wind uplift resistance and ease of application. It installs quicker than membranes that need release liners removed, glue applied, or mechanical fasteners secured.

BRIEF DESCRIPTION OF THE DRAWINGS

None filed.

DETAILED DESCRIPTION

Silicone rubber is used to make release liners for pressure sensitive adhesives because silicone and pressure sensitive adhesives do not bond very well to each other. This invention requires a non-woven scrim as a cuppling agent for both the silicone rubber and the pressure sensitive adhesive. The scrim of choice is made with glass fibers. The strength and flexibility of the scrim is primarily determined by the amount, length and diameter of the glass fibers. Non-woven fiberglass scrims are produced by various manufactures such as Owens Corning Composits Division, 2790 Columbus Road, Route 16, Granville, Ohio, and are available in strengths ranging from a few pounds to several hundred pounds per linear inch. The scrim in addition to being a cuppling agent is primarily responsible for the roofing membranes tensile strength, puncture resistance, and tear resistance.

Silicone rubber sealant is applied to the top surface of the non-woven fiberglass scrim and made to penetrate $\frac{1}{10}$ to $\frac{9}{10}$ of the way into the thickness of the scrim, thus no silicone rubber sealant reaches the bottom or underside surface of the scrim. Silicone rubber sealant needs to penetrate into the fiberglass scrim in order to obtain maximum reinforcement by the scrim. Silicone rubber sealant applied only to the top surface of the non-woven fiberglass scrim and not made to penetrate $\frac{1}{10}$ to $\frac{9}{10}$ of the way into the thickness of the scrim will result in a weak top surface that has poor adhesion. Silicone rubber sealants are produced by various manufacturers such as GE Sealants, Huntersville, N.C. Silicone rubber sealant contributes to the roofing membranes ultraviolet, ozone, and water resistance along with cold and hot temperature performance and flexibility. It has superior weatherability and decorative properties combined with dirt and chemical resistance.

To the remaining $\frac{9}{10}$ to $\frac{1}{10}$ of the scrim's thickness and to the bottom surface of the scrim is applied pressure sensitive adhesive. The pressure sensitive adhesive secures the membrane to the roof substrate. It also contributes to the membranes ultraviolet, ozone, and water resistance along with cold and hot temperature performance and flexibility. It also has insulation and sound deadening properties.

This construction results into a self adherent roofing membrane that can be packaged and transferred in roll form without the need to include an additional release liner sheet or non-blocking material such as talc, mica, or clay powder.

Scrim: The fibers that make up the scrim and the scrim's thickness and strength are chosen based on the intended life of the membrane. A roofing membrane or covering that is intended for temporary use (e.g., Emergencies) may have fibers made of paper, celulose, cotton, rayon, etc. Temporary membranes may be relatively thin (e.g., less than 0.010 inch) and relatively weak (e.g., less than 25 pounds/liner inch). Roofing membranes that must perform for many years should have fibers made of polyester, water resistant metal such as stainless steel, nylon, ceramic, kelvar, glass, etc. Long lasting membranes should have thickness over 0.010 inch and higher strength (e.g., over 25 pounds/linear inch). Preferred scrim for the present invention: Type: non-woven fiberglass, Thickness: 0.010 to 0.040 inches, Strength: 25 to 200 pounds/linear inch.

Silicone Rubber Sealant: Many adhesive and sealant companies formulate and sell silicone rubber sealant. Some of the major manufactures at present are GE, Crompton Corporation, Dow Corning Corp, Gelest Inc., hanse chemie Gmbh, Kion Corporation, Struktol Co., Wright Corp. A roofing membrane or covering that is intended for temporary use may be made with lower performance silicone rubber sealant. Roofing membranes that must perform for many years should be made with high performance silicone rubber sealant such as GE Type I and Type II 100% silicone rubber sealant. Preferred silicone rubber sealant for the present invention: 100% silicone rubber sealant (e.g., Type I or Type II manufactured by GE Sealants & Adhesives).

Pressure Sensitive Adhesives: Pressure sensitive adhesives are adhesives that bond substrates together by making contact and applying pressure. A roofing membrane or covering intended for temporary use may be made with weak pressure sensitive adhesive that does not resist UV light, heat, cold, water, ozone, etc. Examples of such pressure sensitive adhesives include: plasticized SBR rubber, plasticized hydrocarbon resins, plasticized neoprene rubber, polybutene resin, etc. Roofing membranes that must perform for many years should be made with pressure sensitive adhesives that are strong in cold and hot climates and that resist UV light, water, and ozone. Two examples of such pressure sensitive adhesives are acrylic and styrene acrylic that have Tg's from −40 c to −50 c. Preferred pressure sensitive adhesive for the present invention: acrylic (Tg −40 c to −50 c).

The invention is claimed as follows:

1. A roll of roofing membrane consisting of non-woven fiberglass scrim covered and saturated with silicone rubber sealant on the top surface to a depth of $1/10$ to $9/10$ of the way into the thickness of the scrim and covered and saturated with pressure sensitive adhesive on the bottom or underside surface to the remaining $9/10$ to $9/10$ of the scrim's thickness, wherein the pressure sensitive adhesive is an acrylic having a Tg from about −40° C. to −50° C. and wherein roofing membrane is self-adherent.

2. The invention recited in claim 1 wherein the fiberglass scrim is from about 0.010 inches to 0.040 inches thick.

* * * * *